Figure 1:
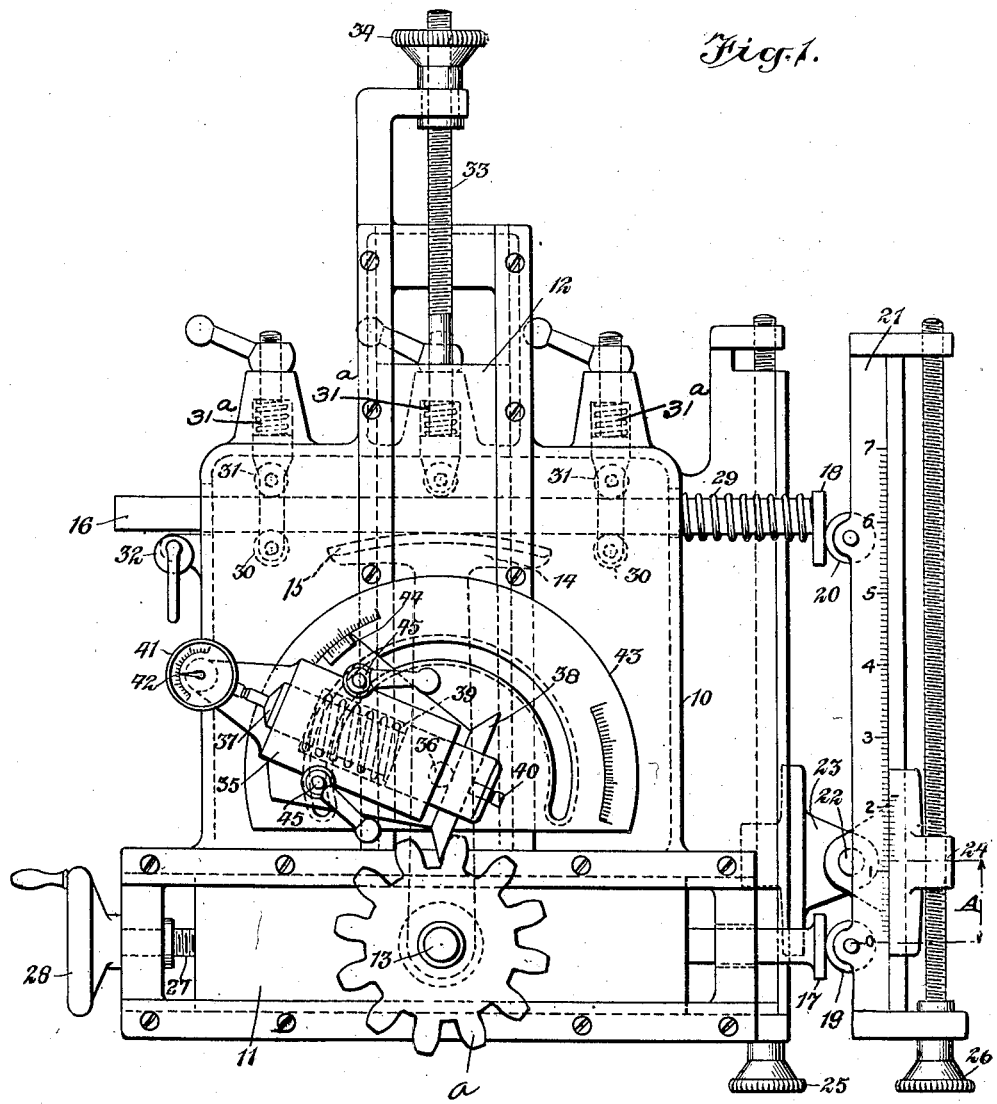

Dec. 8, 1925.

J. LAESSKER 1,564,589

GEAR TESTING MACHINE

Filed Feb. 15, 1921

2 Sheets-Sheet 1

INVENTOR
Jean Laessker
BY
ATTORNEY

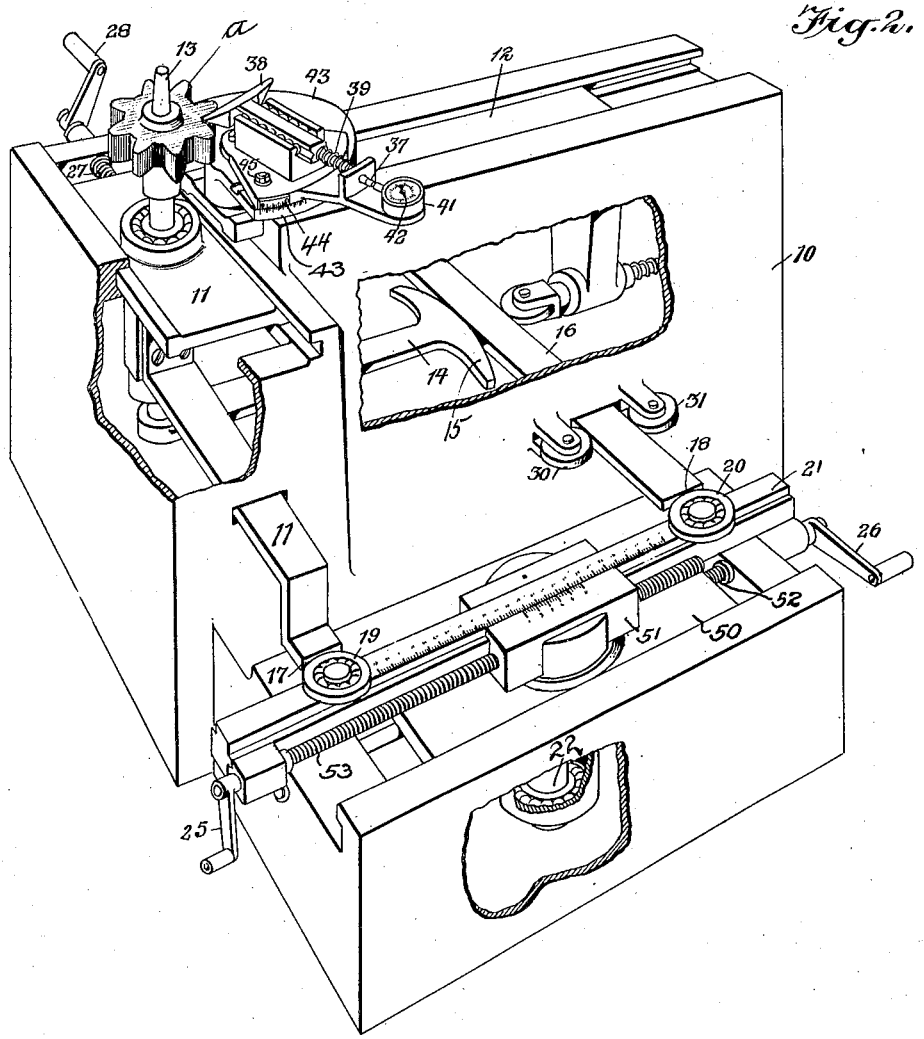

Patented Dec. 8, 1925.

1,564,589

UNITED STATES PATENT OFFICE.

JEAN LAESSKER, OF ARBON, SWITZERLAND, ASSIGNOR TO SOCIÉTÉ ANONYME ADOLPHE SAURER, OF ARBON, SWITZERLAND, A CORPORATION OF SWITZERLAND.

GEAR-TESTING MACHINE.

Application filed February 15, 1921. Serial No. 445,036.

*To all whom it may concern:*

Be it known that I, JEAN LAESSKER, a citizen of the Kingdom of Sweden, and resident of Arbon, Switzerland, have invented certain new and useful Improvements in Gear-Testing Machines, of which the following is a specification.

This invention is an apparatus for testing and measuring of gear wheels, and may be used for the detecting and locating of any inaccuracies in the curvature or form of the gear teeth as well as for determining the pitch circle radius and angle of engagement.

In carrying out my invention I provide a feeler which is mounted to contact with a working face of a tooth of the gear to be tested and has an operating face which may correspond in position or in form or both to a face of a complementary accurately formed gear member. The feeler support and the gear, when in proper relative position, are given a relative rolling movement along the pitch circle of the gear, so that the feeler contacts with successive portions of the gear tooth face between the inner and outer edges of the latter. By mounting the feeler on its support so that it is yieldingly held against the gear tooth face, any relative movement of the feeler in respect to its support during such relative rolling movement indicates an inaccuracy or irregularity in the tooth face. The direction and extent of the feeler movement gives a true indication of the character and extent of the inaccuracy of the tooth face. The portion of the gear tooth face with which the feeler was in engagement during the feeler movement also locates the inaccuracy in the face.

As a preferred form the feeler presents a straight edge which is adjusted to a position and angle corresponding to the position and angle of one side of the face of a tooth on an imaginary rack bar with which the gear would properly mesh. The relative rolling movement of the gear and the imaginary rack bar and along the pitch circle thus causes the straight edge of the feeler to contact with successive portions of the surface of the tooth.

As is well known, the relative rolling movement of a gear and a coacting gear member, such as a rack bar, may be accomplished in three main ways:—first the rolling of the gear along the stationary rack, second, endwise movement of the rack and rotation of the gear about a stationary axis, and third, the rolling of the rack along the periphery of the gear while holding the latter stationary. Although any one of these three, or combinations of such movements might be imparted to the feeler support and the gear to be tested, and are within the broad scope of my invention, I preferably use the first of these ways of obtaining relative rolling movement. I preferably hold the feeler support stationary during the testing, and roll the gear past it so that the indicator operated by the feeler may be more easily observed and any slight movement of the indicator noted.

As one important feature of my invention I provide means whereby the desired rolling movement may be given to the gear to be tested without necessitating the provision of interchangeable parts for gears of different pitch circles, or different number or angle of engagement of the gear teeth. This is preferably accomplished by securing the gear to be tested to a member of fixed radius, and moving the axis of the gear and said member in one direction while moving a peripheral part of the member in the opposite direction. The ratio of the rates of such movements may be varied in accordance with the ratio of the radii of the gear pitch circle and of said member. By making this simple adjustment the apparatus may be used for testing gears of various different pitch circle radii.

As another important feature I provide means whereby the adjustment may be easily and quickly made for a gear of known pitch circle radius or may be adjusted to measure and determine the unknown pitch circle radius of a gear.

As another important feature I so mount the feeler support that it may be easily and quickly adjusted for gears of different pitch circle radius and for gears having different numbers of teeth and different angles of tooth engagement. This adjusting means is also so designed that it may be used for determining the unknown tooth angle of a given gear.

As a further important feature, the feeler is so designed and so mounted that it may be used for the testing of either of the opposite working faces of a gear tooth, and may be easily shifted to either side of the tooth and set at the required angle without disturbing other adjustments of the apparatus.

Various other features of importance are incorporated in a preferred embodiment of my invention shown in the accompanying drawings, in which Figure 1 is a face view of an apparatus embodying my invention, and Figure 2 is a perspective view of a slightly modified form parts being broken away.

In the form illustrated there is provided a main fram 10, serving to support two slides 11 and 12, movable in accurately formed guides, one carrying the gear to be tested and the other carrying the feeler. The slide 11 is provided with a stud 13 or other part upon which may be mounted the gear, a to be tested. The gear is clamped rigid with the stud by any suitable means not shown. In connection with the slide 11, I employ means for giving the gear a rolling movement along its pitch circle during the reciprocation of the slide 11, and irrespective of the radius of the pitch circle. This means is shown as including an arm 14, rigidly secured to the stud 13, and through it to the gear and presenting a smooth surfaced segment 15, concentric with the pitch circle of the gear, and of a fixed radius. This segment engages a slide 16 mounted for movement in the frame in a direction parallel to the slide 11. The gear may thus be rotated by an endwise movement of the slide 16 and a swinging of the arm 14. The slides 11 and 16 terminate in bearing surfaces 17 and 18 resting on anti-frictional rollers 19 and 20 carried by a lever 21 normally at right angles to the direction of movement of the slides 11 and 16, and having a fulcrum 22 intermediate of its ends. Thus, as the slide 11 is moved in one direction the lever 21 is moved about its fulcrum and the slide 16 will move in a direction opposite to that of the slide 11. It will be noted that the axis of the roller 20 with which the slide 16 engages is in the plane of the working face of the slide 16, and that the axis of the roller 19 is opposite to the axis of the gear in the direction of movement of the slide 11. Therefore, if the distance between the axis of the roller 19 and the fulcrum point 22 of the lever 21 and indicated by the line A on Fig. 1 be equal to the pitch circle radius of the gear to be tested, the bodily movement of the slide 11 in either direction from the position shown, will cause such a reverse movement of the slide 16 as will cause the gear to rotate while moving laterally with the slide 11, and this rotation will be at the same rate as would result from the movement of the gear along an accurately formed rack. In effect the arm 14 will oscillate about the point of intersection of its radius normal to the slide 16 and the pitch circle of the gear.

If the gear being tested have a pitch radius equal to the radius of the segment 15, the fulcrum would be adjusted to a position opposite the axis of the roller 20 and the slide 16 would remain at rest during the rolling movement of the gear. If the gear have a pitch radius larger than that of the segment, the fulcrum would be moved to the proper distance above the lower side of the slide 16, and both the slides 11 and 16 would move in the same direction but at different rates during the rolling movement of the gear.

In order to accommodate the apparatus to gears of different pitch circle radii, the fulcrum point is adjustable lengthwise of the lever 21. As shown in Fig. 1, this fulcrum is a pivot pin connecting a pair of bearing numbers 23 and 24, one slidable along the frame of the machine and the other slidable along the lever 21. The movement of these bearing members and the fulcrum pin 22 may be accurately controlled and the parts held in adjusted position by a pair of screws 25 and 26 threaded to the bearing members. One of the slides as for instance the slide 11, is provided with means for manually moving it endwise in either direction at a slow and controlled rate, such means being illustrated as a screw 27 with an operating handle 28. The other slide, 16 is provided with a coil spring 29 for holding both slides in proper operating engagement with the lever 21.

The lever 21 is preferably provided with a scale, the zero point of which is opposite to the axis of the gear to be tested and preferably the scale is calibrated to directly show the pitch circle radius of the gear to be tested. Thus the position of the bearing member 24 and the distance of the fulcrum from the zero point of the scale may be easily read. If this radius of the gear is known, the fulcrum point 22 is adjusted lengthwise of the scale to the point indicating this known radius.

Any suitable means may be provided for guiding the slide 16 during its longitudinal movement, but preferably I employ pairs of guiding rollers 30 and 31, and spring means 31ª for holding the slide in frictional engagement with the segment 15.

The guide rollers 30 and 31 are carried by supports which are slidably mounted in the main frame, and movable in a direction at right angles to the path of movement of the slide 16. The rollers engage with opposite sides of the slide so as to bodily carry the slide toward and from the segment 15, as said supports move endwise. Encircling the supports are springs 31ª engaging between shoulders on the supports and shoulders formed by the inner ends of the sockets in the main frame which receive said springs. The outer ends of the supports are threaded and provided with nuts, whereby the supports may be pulled outwardly against the action of the springs to hold the slide 16 free of the segment 15. By loosening the nuts the springs move the supports inwardly endwise, and resiliently press the slide against the segment. For lifting the slide off the segment to facilitate the proper adjustment of the parts upon the insertion of the gear to be tested, I provide an eccentric 32.

The slide 12 which is movable in a direction at right angles to the slides 11 and 16, carries the indicator and indicator operating member or feeler, and the means for adjusting the latter to gears of different diameters, gear teeth of different depth, and gear teeth faces of different angles of engagement. As shown, the slide 12 is adjusted by means of a threaded rod 33 and nut 34 and carries a support 35 mounted to swing in a plane parallel to the plane of the slides 11 and 16, and about a pivot pin or axis 36. Mounted in this support 35 is a sliding plunger member 37 having a feeler 38, adapted to engage with the working face of the gear tooth to be tested. The plunger member 37 is pressed in one direction by a helical spring 39, so as to yieldingly hold the feeler against the gear tooth and by a locking screw 40 the feeler is held fast in the plunger member 37.

The support 35 also carries an indicator. Merely for purposes of illustration, I have shown such indicator in the form of a dial 41 with a pointer 42 having operative connections with the slide 37 whereby as the slide moves endwise in respect to the support, the pointer is caused to swing about its axis and over the dial. The details of such connections form no portion of my invention, and may be varied at will.

The slide 12 carries a graduated arc 43 and the support 35 has a pointer 44 properly juxtaposed to the scale on the arc. Both the support 35 and the graduated arc 43 are carried by the slide 12 and the support 35 may be clamped to the arc in any desired angular adjustment about the pivot 36, by means of one or more clamping members 45. The scale on the arc is graduated to read directly the angle of engagement of the tooth face, and the feeler 38 projects in opposite directions from the support so that either end may be brought into operation. As shown, one end is in engagement with the left hand side of a gear tooth, but by swinging the support 35 clockwise through the proper angle, the opposite end of the feeler may be brought against the other side of the gear tooth, and the pointer 44 will come adjacent to another section of the scale, also directly indicating the angle of engagement of the tooth face.

In Figure 2 I have shown a device very similar in most respects to that shown in Figure 1, except that the parts are more diagrammatically illustrated and in perspective, and many parts are broken away. A somewhat different mechanism for adjusting the position of the lever fulcrum is shown. A slide 50 carries a spindle 22 upon the upper end of which there is provided a block 51. This slide 50 may be adjusted in the direction of the length of the lever by means of a threaded rod 52 operated by the handle 26. The lever 21 is provided with a threaded rod 53 which engages in block 51. By rotating this threaded rod by means of the crank 25 the lever may be moved endwise in the block 51. The position of the spindle 22 determines the pivotal center or fulcrum of the lever, and this may be moved to any desired position by the handle 26. Either during the shifting of the position of the fulcrum or after it has been shifted, the crank 25 is turned in the proper direction to hold or bring the rollers 19 and 20 in proper position in respect to the bearing surfaces 17 and 18 on the ends of the slides 11 and 16.

My improved device is capable of being used in various different ways, and for different purposes. Among such methods of operation are the following:

Assuming that the pitch radius of the gear $a$ is known, and the angle of engagement of the tooth face is also known, the fulcrum 22 is adjusted toward the slide 16 until the distance indicated by the line A is equal to the pitch radius as indicated by the scale on the lever. The support 35 is moved about its pivot 36 until the pointer 44 is opposite the known angle of engagement of the tooth face. The slide 12 is adjusted toward the gear, until the feeler 38 enters to the proper distance between the gear teeth, the slide 16 being raised. The position of the pointer 42 on the dial 41 is then noted, the slide 16 is then lowered by the eccentric 32 on the segment and the handle 28 is then slowly rotated in either, or alternately in both directions. As the slide 11 moves endwise, the gear axis will be moved bodily and the action of the lever 21, slide 16, and arm 14 will be such as will cause a turning of the gear about its axis. The resulting movement of the gear is thus a true rolling movement of the gear on its pitch circle. The feeler 38 has its straight face at the angle and in the position of a face of an imaginary rack bar along which the gear may be assumed to roll. Thus, if the working face of the gear be perfect in form and free from any irregularities the rolling movement of the gear will not produce any movement whatsoever of the feeler 38, and the pointer 42 will remain at rest. If there is any irregularity in the formation of the tooth face it will cause or permit an endwise movement of the slide 37 with the feeler, and this will be indicated by the pointer 42. The exact portion of the gear face which is in contact with the feeler during such movement of the pointer may be noted, as well as the direction of movement of the pointer. Thus the character and location of the inaccuracy or irregularity in the gear face will be shown.

Each tooth may be separately tested, and the opposite face may be tested by swinging the support to bring the other end of the feeler into position.

If the pitch radius of the gear is known but the angle of engagement of the gear teeth is to be determined, the gear will be secured in position as before, and the fulcrum is adjusted to the proper pitch radius. The operator guesses at the approximate tooth angle and sets the support 35 accordingly. This adjustment is altered with successive rolling movements of the gear until the proper position is reached at which there is no movement of the pointer 42, assuming the gear face be free from inaccuracy. The reading of the pointer 44 will then give the tooth angle. If the tooth be slightly inaccurate, the support 35 is adjusted until the pointer 42 gives the same reading with the feeler at the outermost and innermost portions of the side of the tooth.

If the angle is known but the pitch radius is to be determined, the support 35 is set with its pointer 44 at the proper position on the graduated arc 43, and the fulcrum 22 adjusted back and forth until the pointer 42 remains stationary during the rolling movement of the gear, or at least is stationary when the feeler is at the outermost and innermost portions of the tooth face.

If neither the pitch radius nor the tooth angle is known, both of these are estimated and the proper adjustments of the fulcrum and feeler are made. By continuing the adjustment and giving the gear its rolling movement for each adjustment the proper pitch radius and tooth angle may be eventually determined.

As has previously been pointed out, various other means might be employed for giving to the gear its rolling movement along its pitch circle or in respect to a cooperating imaginary rack.

The slide 12 is shown as movable at a right angle to and in a plane parallel to slides 11 and 16 for testing spur gears. Appropriate change can be made in the frame so as to give the proper direction and angle of movement and relationship of the parts for testing helical, bevel or other forms of gears. I have referred to the rolling of the gear on its pitch circle, but for some special gears the rolling might be on some other circle. As the apparatus tests only one tooth at a time, it is equally applicable to to testing gear segments which I include in the broad term of gear.

Having thus described my invention, what I claim as new and desire to secure by Letters Patent is:

1. An apparatus for testing gears, including a support for the gear to be tested, a member having straight line back and forth movement in a plane at right angles to the axis of the gear support, a feeler carried thereby and adapted to engage a working face of a tooth of the gear held on said support, means for effecting a relative rolling movement of said feeler and said gear, and means acting on said member for holding said feeler in yielding engagement with the tooth face during said rolling movement.

2. An apparatus for testing gears, including a support for the gear to be tested, a feeler adapted to engage a working face of the gear held on said support, a guiding support for said feeler permitting straight line back and forth movement of the feeler in respect to the support, yielding means pressing said feeler in one direction of said straight line movement and resisting but permitting movement in the opposite direction in respect ot said second mentioned support, and means for effecting a relative rolling movement of one support in respect to the other.

3. An apparatus for testing gears, including a support for the gear to be tested, a feeler adapted to engage a working face of the gear held on said support, a guiding support for said feeler permitting straight line back and forth movement of the feeler in respect to the support and in a direction substantially tangential to the pitch circle of said gear, yielding means pressing said feeler in one direction of said straight line movement and resisting but permitting movement in the opposite direction in respect to said second mentioned support, and means for effecting a relative rolling movement of one support in respect to the other.

4. An apparatus for testing gears, including a gear support, a feeler having an operating face corresponding in normal position and angle to an imaginary rack bar tooth meshing with a gear held on said support, a support for said feeler, said feeler having straight line back and forth movement in respect to said second mentioned support, yielding means for resisting said movement in one direction, and means for effecting a relative rolling movement of one support in respect to the other.

5. An apparatus for testing gears, including a gear support, means for moving said support in a direction at right angles to the axis of the gear support, and imparting to said gear a rolling movement along its pitch circle, and a feeler having a straight line operating face corresponding in normal position and angle to an imaginary rack bar tooth meshing with said gear.

6. An apparatus for testing gears, including a gear support, a feeler, a feeler support mounted for back and forth straight line movement in a plane at right angles to the axis of the gear support, means for yieldingly holding said feeler in engagement with the working face of a tooth of a gear held on said gear support, and means for rolling said gear along its pitch circle.

7. An apparatus for testing gears, including a member presenting a curved surface, and mounted to oscillate about the center of curvature, and adapted to receive the gear to be tested with its pitch circle concentric with said curved surface, and means for moving the axis of the gear held on said member in one direction and said curved surface in the opposite direction, whereby a rolling movement is imparted to said gear.

8. An apparatus for imparting a rolling movement to a gear, including a member presenting a curved surface, and adapted to carry the gear to be tested with its pitch circle coaxial with said curved surface, and means for moving the axis of said gear in one direction and said curved surface in the opposite direction.

9. An apparatus of the character defined in claim 8, having means for varying the relative rates of movement of said axis and curved surface.

10. An apparatus for imparting a rolling movement to a gear, including a member having a segment, and adapted to support the gear to be tested with its pitch circle coaxial with said segment, and means for oscillating said member about the point of intersection of a radius of said segment and the pitch circle of the gear supported by said member.

11. An apparatus as defined in claim 10, having means for varying the center of oscillation of said member in accordance with the pitch circle radius of the gear.

12. An apparatus for imparting a rolling movement to a gear, including a member adapted to carry the gear to be tested and having a curved segment coaxial with the pitch circle of said gear, and a lever pivoted intermediate of its ends and operatively connected to said member for moving the gear axis in one direction and said segment in the opposite direction.

13. An apparatus for imparting a rolling movement to a gear, including a member having a curved segment and adapted to be rigidly connected to the gear to be tested with the pitch circle of the gear coaxial with said segment, a lever pivoted intermediate of its ends and operatively connected to said member for moving the gear axis in one direction and said segment in the opposite direction, and means for adjusting the fulcrum point of the lever along the length of the latter.

14. An apparatus for imparting a rolling movement to a gear, including a slide, a member pivoted in said slide, and presenting a curved segment, adapted to carry the gear to be tested with its axis coincident with the axis of said segment, a slide parallel to said first mentioned slide and engaging with said curved segment, and means for moving one of said slides in one direction and the other in the opposite direction.

15. An apparatus for imparting a rolling movement to a gear, including a slide, a member pivoted thereto presenting a curved segment rigid with the gear to be tested and with its axis in alignment with the axis of said gear, a slide parallel to said first mentioned slide and engaging with said curved segment, and a lever for moving one of said slides in one direction and the other in the opposite direction.

16. An apparatus for imparting a rolling movement to a gear, including a slide, a member pivoted thereto and presenting a curved segment rigid with the gear to be tested and with its axis coincident with the axis of said gear, a slide parallel to said first mentioned slide and engaging with said curved segment, a lever for moving one of said slides in one direction and the other in the opposite direction, and means for varying the position of the fulcrum point of the lever in accordance with the pitch radius of the gear to be tested.

17. An apparatus for imparting a rolling movement to a gear, including a pair of parallel slides, a gear supporting member pivotally connected to one side and having a curved surface concentric with the gear and engaging with the other slide, a lever pivoted intermediate of its ends and engaging with both of said slides, and having a scale thereon, and means for adjusting the fulcrum of the lever along the latter to a point on the scale corresponding to the pitch radius of said gear.

18. An apparatus for testing gears, including means for imparting a rolling movement to the gear to be tested, a feeler adapted to engage with the face of a tooth of said gear, a support for said feeler, a guide and means for adjusting said support along said guide toward and from the axis of the gear.

19. An apparatus for testing gears, including means for imparting a rolling movement to the gear to be tested, a feeler having a face adapted to engage with the face of a tooth of said gear, and a support for said feeler, said support being angularly adjustable to vary the angle of engagement of the face of the feeler with the face of the gear tooth.

20. An apparatus for testing gears, including a reciprocatory slide, means for mounting the gear thereon, means for imparting a rolling movement to said gear during a reciprocation of the slide, a second slide substantially at right angles to the first mentioned slide, a feeler support carried by said second mentioned slide, and a feeler yieldingly mounted on said support.

21. An apparatus for testing gears, including a reciprocatory slide, means for mounting the gear thereon, means for imparting a rolling movement to said gear during a reciprocation of the slide, a second slide substantially at right angles to the first mentioned slide, a feeler support carried by said second mentioned slide, a feeler resiliently mounted on said support and means for adjusting said support angularly in respect to said second mentioned slide.

22. An apparatus for testing gears, including a support for the gear to be tested, means for imparting a rolling movement to said gear, a feeler adapted to engage with a tooth of the gear, a slide carrying said feeler, a guide for said slide, yielding means acting on said slide to hold the feeler against the gear tooth, and an indicator operating upon relative movement of the slide and support.

23. An apparatus for testing gears, including a support for the gear to be tested, means for imparting a rolling movement to said gear, a feeler presenting an edge for engagement with a tooth face, a feeler carrier, a support for said carrier and permitting of the reciprocation of the carrier during rolling movement of the gear, and an indicator operated upon such reciprocation.

24. An apparatus for testing gears, including a support for the gear to be tested, a feeler presenting a straight edge, a feeler carrier engaging the feeler intermediate of the ends, and a pivotal support for said carrier permitting it to move in opposite positions to bring one end of said feeler into engagement with one face of a tooth of said gear or the opposite end of the feeler into engagement with the opposite face of said tooth.

25. An apparatus for testing gears, including a reciprocatory slide, guiding means therefor, means for mounting a gear on said slide, means for imparting a rolling movement to said gear during reciprocation of the slide, a second reciprocatory slide, guiding means therefor, and a feeler carried thereby and adapted to engage with the working face of a tooth of the gear, one of said guiding means being angularly adjustable in respect to the other to vary the direction of movement of the second mentioned slide in respect to the direction of movement of the first mentioned slide.

26. An apparatus for testing gears, including a slide, means for mounting a gear thereon, means for imparting a rolling movement to said gear during reciprocation of the slide, a second slide, a feeler carried thereby and adapted to engage with the working face of a tooth of the gear, and means for bodily adjusting said second mentioned slide toward and from the first mentioned slide.

27. An apparatus for testing gears, including a slide adapted to support the gear to be tested, a second slide moveable in the direction at right angles to the direction of movement of the first mentioned slide, a third slide carried by the second mentioned slide and angularly adjustable in respect to the latter, and a feeler carried by the third mentioned slide and adapted to engage with a face of a tooth of said gear.

28. An apparatus of the class described, including a feeler presenting a straight edge, a support for holding said edge in position and angle corresponding to a tooth face of an imaginary rack bar, means for rolling the gear to be tested along said imaginary rack bar, yielding connections between said feeler and said support, and an indicator showing the relative movement of the feeler and support, corresponding to irregularities or inaccuracies of the tooth face of said gear with which the feeler engages.

29. An apparatus for testing gears, including means for imparting a rolling movement to the gear to be tested and along its pitch circle, a feeler presenting a straight edge and corresponding to a face of a tooth of an imaginary rack bar meshing with the gear to be tested, a support for said feeler, yielding connections between said support and said feeler, means for adjusting the position of the support in accordance with the radius and tooth angle of the gear to be tested, and an indicator operating upon relative movement of the feeler and its support, and showing the irregularities or inaccuracies of the tooth face with which the feeler engages during the rolling movement of the gear.

30. An apparatus for testing gears, including a support for the gear to be tested, a feeler presenting a straight edge for engagement with the tooth of the gear to be tested, a feeler carrier, a support for said carrier and permitting of the reciprocation of the carrier, an indicator operating upon such reciprocation, and means for imparting a relative rolling movement to said gear and said carrier support.

31. An apparatus for testing gears, including a support for the gear to be tested, a feeler, a feeler carrier, means for supporting said carrier with one end of said feeler in engagement with one face of a tooth of said gear or with the opposite end of the feeler in engagement with the opposite face of said tooth, and means for effecting a relative rolling movement of said gear and said feeler.

32. An apparatus for testing gears, including a feeler adapted to yieldingly engage with the working face of a tooth of the gear to be tested, a support for said feeler, means for adjusting said support toward and from the axis of said gear, means for permitting adjustment of said support to vary the angle of engagement of the feeler with the tooth face, and means for effecting a relative rolling movement of the gear and feeler.

33. An apparatus for imparting a rolling movement to a gear, including a gear supporting member having a segment concentric with the pitch circle of the gear, means for oscillating said member about the point of intersection of a radius of said segment and the pitch circle of the gear held by said supporting member, and at the same time moving said point in a direction tangential to said pitch circle.

34. A gear testing apparatus including a support for the gear to be tested, a feeler having a pair of contact faces, a feeler carrier, a pivotally mounted support in which said carrier may reciprocate, means for normally holding said second mentioned support against pivotal movement, and means for holding said second mentioned support with one face of said feeler against one face of a gear tooth, of a gear held by said support, or the other face of the feeler against the opposite face of the gear tooth.

35. A gear testing apparatus including a support for the gear to be tested, a feeler having a pair of contact faces, a feeler carrier, a pivotally mounted support in which said carrier may reciprocate, means for normally holding said second mentioned support against pivotal movement, means for holding said second mentioned support with one face of said feeler against one face of a gear tooth of a gear held by said support, or the other face of the feeler against the opposite face of the gear tooth, and an indicator operated by the relative movement of said carrier and said second mentioned support during a relative rolling movement of one support in respect to the other.

36. A gear testing apparatus including a support for the gear to be tested, a slide adjustable radially of the axis of the gear, a support pivoted thereon to swing about an axis parallel to but spaced from the axis of the gear held by said support, means for normally holding said second mentioned support against pivotal movement, a feeler carrier mounted on said last mentioned support for reciprocation radially of the second mentioned axis, and a feeler on said carrier.

37. A gear testing apparatus including a support for the gear to be tested, a second support pivoted to swing about an axis parallel to but spaced from the axis of the gear held by said support, means for normally holding said second mentioned support against pivotal movement, and a feeler carrier mounted on said second mentioned support for reciprocation radially of said first mentioned axis.

38. A gear testing apparatus including a support for the gear to be tested, a feeler carrier, means for mounting it for reciprocation along a path substantially tangential to the gear held by said support, a feeler carried by said feeler support and resilient means tending to move said carrier and feeler in one direction along said path and to hold said feeler in engagement with the surface of a tooth of the gear to be tested.

39. A gear testing apparatus including a gear support, means for moving it in a direction at right angles to the axis of a gear held by said support, means for simultaneously moving it angularly about the axis of the gear to give a rolling motion to the gear, and means for varying the relative rates of said movements.

40. A gear testing apparatus including a gear support, means for moving it in a direction at right angles to the axis of a gear held by said support, means for simultaneously moving it angularly about the axis of the gear to give a rolling motion to the gear, and a member adjustable to different positions to vary the relative rates of said movements.

41. A gear testing apparatus including a gear support having a curved surface of fixed radius and concentric with the pitch circle of the gear held by said support and to be tested, a member having rolling contact with said surface, means for moving said member endwise during a rolling movement of said gear support along said member, and means for varying the relative rates of said movements.

42. A gear testing apparatus including a gear support having a curved surface of fixed radius and concentric with the pitch circle of the gear held by said support and to be tested, a member having rolling contact with said surface, and means for reciprocating said member in one direction during a rolling movement of said gear support along said member in the opposite direction.

43. A gear testing apparatus including a gear support having a curved surface of fixed radius and concentric with the pitch circle of the gear held by said support and to be tested, a member having holding contact with said surface, means for rolling said surface along said member, and means for simultaneously moving said member in a direction parallel to said surface.

Signed at St. Gallin, Switzerland this 19th day of January, A. D. 1921.

JEAN LAESSKER.